United States Patent [19]

Ruggeberg, Sr. et al.

[11] 4,453,585
[45] Jun. 12, 1984

[54] WINDOW THERMAL INSULATION DEVICE

[76] Inventors: Bruno Ruggeberg, Sr., 1393 Langley Dr., Gardnerville, Nev. 89410; James R. Moniz, 2227A Heybourne Rd., Minden, Nev. 89423

[21] Appl. No.: 282,020

[22] Filed: Jul. 10, 1981

[51] Int. Cl.³ .............................................. E06B 3/26
[52] U.S. Cl. ...................................... 160/354; 52/202; 52/222; 160/368 R; 160/380
[58] Field of Search ................ 52/202, 203, 222, 377, 52/125.2, 63; 160/354, 368, 380

[56] References Cited

U.S. PATENT DOCUMENTS

| 792,833 | 6/1905 | Lee | 160/354 |
|---|---|---|---|
| 2,612,947 | 10/1952 | Jenks | 160/354 |
| 2,714,546 | 8/1955 | Lesniak | 52/202 |
| 3,848,380 | 11/1974 | Assael | 52/222 |
| 3,885,335 | 5/1975 | Egermayer | 160/394 |
| 3,888,063 | 6/1975 | Frantz | 52/656 |
| 4,164,105 | 8/1979 | Herbst et al. | 52/202 |
| 4,189,880 | 2/1980 | Ballin | 52/222 |
| 4,341,255 | 7/1982 | Mock | 160/368 |

FOREIGN PATENT DOCUMENTS 1271360 6/1968 Fed. Rep. of Germany ........ 52/203

Primary Examiner—Henry E. Raduazo

[57] ABSTRACT

Window thermal insulation device for thermal insulation of a window opening area, including a plurality of linear members arranged in successive end to end relation for forming a perimetric selectively sized and shaped enclosure frame defining a window space therewithin, a like plurality of interconnectors for interconnecting the adjacent ends of the linear members, linear locking grooves in the linear members and extending therealong peripherally outwardly of the window space, a pliable plastic thermal insulation sheet extending across the window space of the frame and having its peripheral margins disposed correspondingly in the locking grooves of the linear members, a like plurality of linear cover strips having linear locking tongues projecting therefrom and disposed correspondingly in gripping contact with the adjacent portions of the peripheral margins of the plastic sheet and in releasable locking engagement with the adjacent locking grooves and arranged for maintaining the plastic sheet in substantially taut condition across the window space, and perimetric compression thermal insulation sealing means, e.g. of resilient compressible sponge material, extending along the linear members peripherally outwardly of the enclosure frame for compression sealing contact peripherally outwardly against a counterpart receiving frame portion of an existing correspondingly sized and shaped window opening structure to be thermally insulated thereby, preferably with retaining insert means being provided in the ends of the linear members for correspondingly receiving the interconnectors thereat.

9 Claims, 5 Drawing Figures

WINDOW THERMAL INSULATION DEVICE

The present invention relates to a window thermal insulation device for thermal insulation of a window opening area, and more particularly to such a device contemplating a minimum number of elements readily assembled and usable as a simple removable insert in a counterpart existing window opening structure.

In the past, outside storm windows have been used for added thermal insulation purposes, but these are generally costly to produce, often heavy and awkward in construction, rendering them cumbersome and difficult to install and remove, and even dangerous in terms of sealing off escape through a window covered thereby in the event of an emergency such as a fire. While inside so-called storm windows have also been used in the past, these also are usually costly to produce and often heavy and awkward in construction, rendering them cumbersome and difficult to install and remove. Besides, the construction of such inside storm windows still leaves something to be desired in the event of an emergency because they are normally mounted in place in a semi-permanent manner with attachment fixtures that cannot be quickly released for removal should escape through the window become necessary.

It is among the objects and advantages of the present invention to overcome the drawbacks and deficiencies of the prior art and to provide an improved window thermal insulation device for thermal insulation of a window opening area, which utilizes a minimum number of widely available and inexpensive types of elements which may be readily and easily assembled with reduced effort, labor, material and production costs including tooling; which is durable and robust in use yet relatively light in weight and easy to hold and manipulate; and which permits simple and rapid installation and removal and is therefore safe in terms of providing an available escape route through the window in the event of an emergency.

It is among the additional objects and advantages of the present invention to provide a device of the foregoing type which is highly efficient in providing insulation from exchange of heat and/or cold through the window area at which it is installed; which may be mounted as an inside or outside storm window and in a manner permitting easy removal for cleaning or storage; which is essentially fire-proof and thus serves as an added protection when installed as a so-called inside storm window; and which is adapted to be used on both old and new window opening structures, with equally favorable accommodation and thermal insulation results.

Other and further objects and advantages of the present invention will become apparent from the within specification and accompanying drawings, in which.

Figure 2:
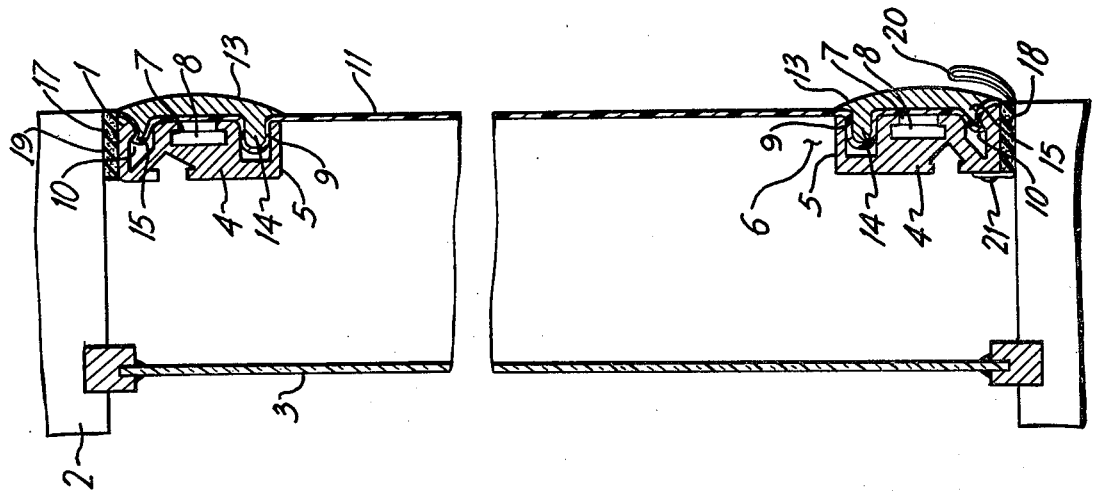
FIG. 2 is a schematic enlarged sectional view taken along the line 2—2 of FIG. 1, showing the spatial relationship of the device of the invention to a normal permanent window in the frame structure as well as certain details of construction of the device itself.

In accordance with the present invention, an improved window thermal insulation device for thermal insulation of a window opening area is advantageously provided. The device comprises a plurality of individual linear members arranged in successive end to end relation for forming a perimetric selectively sized and shaped enclosure frame defining a window space therewithin, and a corresponding plurality of individual stabilizing interconnectors arranged for interconnecting correspondingly the adjacent ends of the linear members and for maintaining the linear members in successive end to end interconnected stable disposition.

Linear locking groove means are defined in the linear members and extend therealong peripherally outwardly of the window space, and a pliable thin plastic thermal insulation sheet is provided which extends across the window space of the frame and has its peripheral margins disposed correspondingly in the locking groove means of the linear members.

In turn, a corresponding plurality of individual linear cover strips are provided, having linear locking tongue means projecting therefrom and disposed correspondingly in gripping contact with the adjacent portions of the peripheral margins of the plastic sheet and in releasable locking engagement with the adjacent locking groove means and arranged for maintaining the plastic sheet in substantially taut condition across the window space.

Significantly, perimetric compression thermal insulation sealing means are also provided which extend along the linear members peripherally outwardly of the enclosure frame for compression sealing contact peripherally outwardly against a counterpart receiving frame portion of an existing correspondingly sized and shaped window opening structure to be thermally insulated by the device.

Preferably, retaining insert means are provided in the corresponding ends of the linear members. In this regard, the interconnectors are in turn successively insertingly received in the correspondingly opposed retaining insert means at the adjacent ends of the linear members for interconnecting such adjacent ends of such linear means and for maintaining the linear members in successive end to end interconnected stable disposition. The retaining insert means may be advantageously arranged to embrace the adjacent portions of the interconnectors insertingly received therein and suitably crimped thereagainst for maintaining the interconnectors in substantially stationary and permanently fixed disposition therein.

Specifically, the locking tongue means of the cover strips may preferably include correspondingly gripping tongues and seating tongues, and the locking groove means of the linear members in turn may likewise include corresponding counterpart gripping tongue receiving grooves and seating tongue receiving grooves for operatively receiving the gripping tongues and seating tongues respectively for maintaining the cover strips in substantially stationary yet removable disposition on the linear means, with the adjacent portions of the peripheral margins of the plastic sheet interposed in gripping engagement between the gripping tongues and gripping tongue receiving grooves and with the seating tongues in seating engagement with the seating tongue receiving grooves.

In particular, the seating tongues may be suitably located peripherally outwardly of the gripping tongues and the seating tongue receiving grooves in turn may be likewise located peripherally outwardly of the gripping tongue receiving grooves. Accordingly, the adjacent portions of the peripheral margins of the plastic sheet in such instance may advantageously extend peripherally outwardly to the seating tongue receiving grooves and also be interposed in gripping engagement between the seating tongues and seating tongue receiving grooves.

In accordance with a particularly favorable preferred optional feature of the present invention, the gripping tongues may be advantageously provided with friction enhancing or roughened surface portions for enhanced friction gripping surface contact with the corresponding adjacent portions of the peripheral margins of the plastic sheet thereat.

The perimetric sealing means may favorably be provided in the form of a resilient compressible, fluid impervious sponge material, e.g. of rubber or plastic, especially having closed sponge spaces preventing fluid flow therethrough.

The plastic sheet may be suitably a light admitting and fluid impervious sheet, and of course completely imperforate as well, so as to prevent fluid flow therethrough in this instance also. The plastic sheet is preferably substantially dimensionally stable within its own plane and substantially resistant to tension forces acting in the resultant direction of its own plane. The plastic sheet is advantageously composed of nylon, and while it will normally be colorless and completely transparent, it may alternatively be provided in tinted color form, or be translucent or even opaque, depending upon the particular purpose intended, as the artisan will appreciate.

Figure 1:
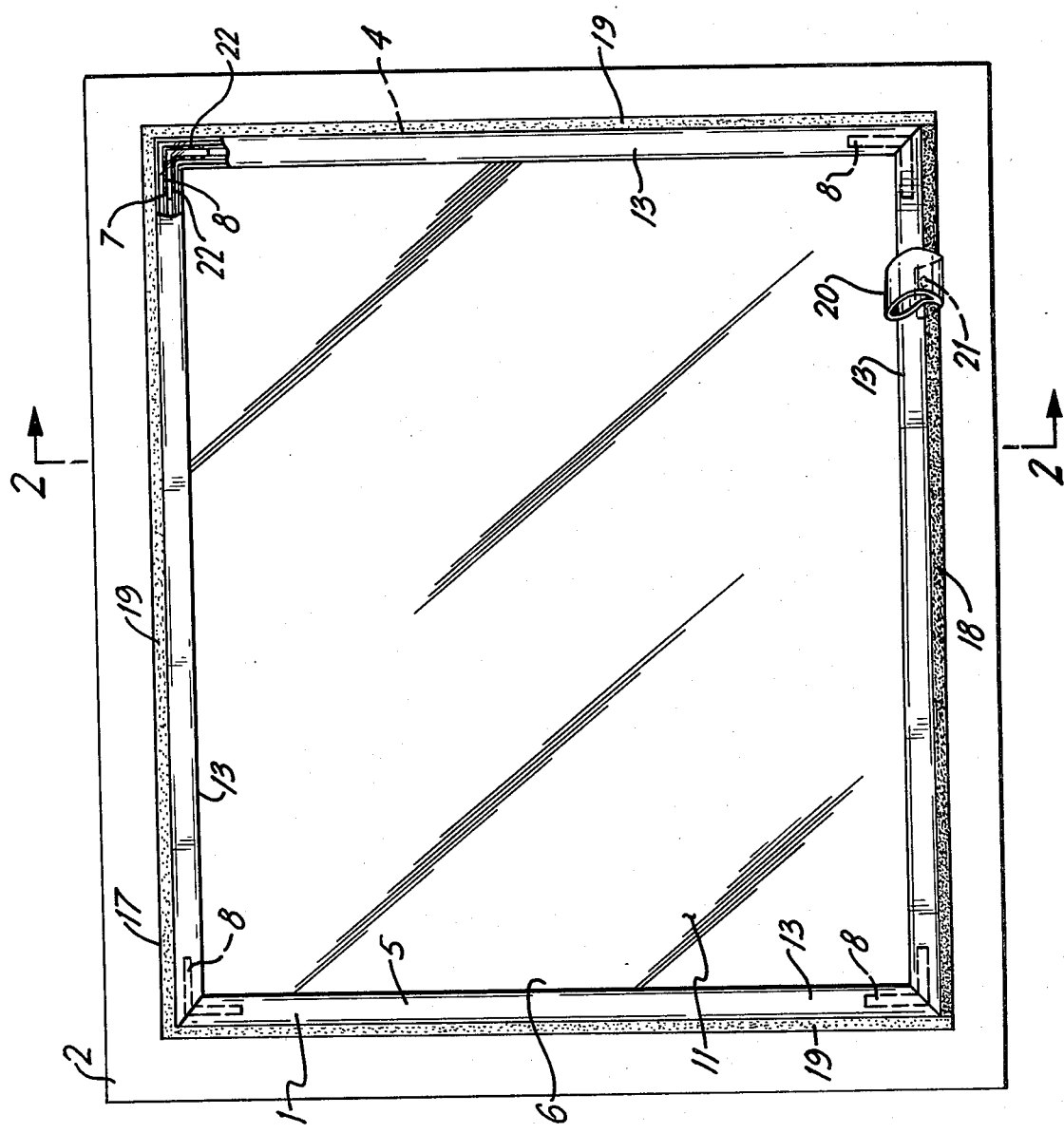
FIG. 1 is a schematic elevational view of an embodiment of the window thermal insulation device of the invention and its disposition in a window opening frame structure, with the device partially broken away to indicate a detail of construction.

Referring to the drawing, and initially FIGS. 1 and 2, an embodiment of the window thermal insulation device 1 according to the invention is shown nested in a counterpart receiving frame portion 2 of an existing window opening structure to be thermally insulated by device 1 relative to the normal window 3 (FIG. 2). Four individual straight linear structural members 4 (FIG. 2) are arranged in successive longitudinal end to end conforming abutment relation or contiguous relation for forming thereby a perimetric selectively sized and right rectangularly shaped generally planar enclosure frame 5 which defines a window space 6 therewithin and which correspondingly has an outer perimetric edge portion or outside boundary wall surface at the outermost point of its periphery.

Retaining insert means 7, e.g. in the form of straight linear internal cavities or troughs, are disposed in the ends, i.e. within the end portions, of the linear members 4, and in fact may extend throughout the full length of the linear members and constitute a common continuous internal retaining means or cavity or trough 7, if desired. Four corresponding stabilizing right angular internal interconnectors 8 are successively insertingly received in the correspondingly opposed retaining insert means or troughs 7 at the adjacent ends, i.e. within such end portions, of the linear means 4, i.e. at the corners of the frame 5 and in completely hidden condition internally within the linear members 4 at the internally disposed retaining means or trough 7 therein. Interconnectors 8 are arranged for interconnecting correspondingly the adjacent ends of the linear members 4 and for maintaining the linear members in the desired successive end to end, interconnected stable disposition, i.e. at the corners of the frame 5.

It will be appreciated that the frame 5 may be provided of any desired shape utilizing any suitable plurality of linear members and corresponding interconnectors. Thus, the frame 5 may constitute a selectively sized and shaped triangle, pentagon or other polygonal shape and the interconnectors will vary in their angular disposition accordingly, e.g. having an acute angle for a triangular frame shape, or an obtuse angle for a pentagonal or other polygonal frame shape. Moreover, the frame may take the selective size and shape of a particular circle or ellipse, or the like, in which case the linear members and interconnectors will be appropriately arcuate or curvi-linear in shape.

Such alternative sizes and shapes of course will depend upon the corresponding size and shape of the counterpart receiving frame portion of the existing window opening structure with respect to which the device of the invention is to be used, as the artisan will appreciate.

Linear locking groove means, e.g. in the form of corresponding straight linear gripping tongue receiving grooves 9 and straight linear seating tongue receiving grooves 10, are defined in the linear members 4 and extend therealong peripherally outwardly of the window space 6 and inwardly of the outer perimetric edge portion or boundary edge of the frame. The seating grooves 10 are suitably located peripherally outwardly of the gripping grooves 9.

A light admitting and fluid impervious pliable plastic thermal insulation sheet 11, e.g. an imperforate transparent nylon sheet, extends across the window space 6 of the frame 5 and has its peripheral margins 12 (FIG. 4) disposed correspondingly in the gripping grooves 9 and in the seating grooves 10 of the linear members 4.

Figure 4:
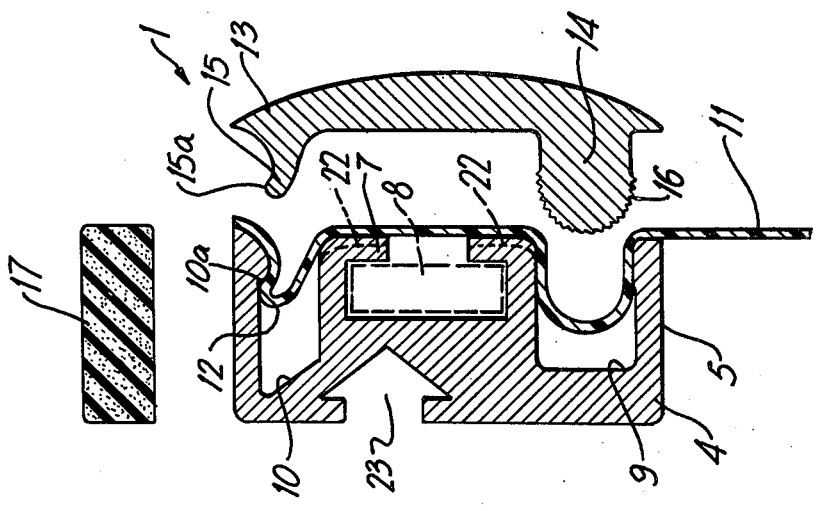
FIG. 4 is a schematic enlarged exploded sectional view of a portion of the device of FIG. 1, showing particular details of construction.

Four straight external linear cover strips 13, i.e. located externally on the frame 5 and situated within the width confines of the frame between the window space 6 and the outer perimetric edge portion or boundary edge of the frame 5, are provided with counterpart linear locking tongue means, e.g. in the form of corresponding straight linear gripping tongues 14 and straight linear seating tongues 15, projecting therefrom. These tongue means are disposed correspondingly in compression gripping contact with the adjacent portions of the peripheral margins 12 of the plastic sheet 11 and in compression locking engagement with the adjacent locking groove means and arranged for maintaining the plastic sheet in substantially taut or tight condition across the window space 6 and the peripheral margins 12 thereof correspondingly in compressively lockingly engaged and compressively seatingly engaged condition (FIGS. 2 and 4).

Specifically, the gripping tongues 14 and seating tongues 15 are disposed correspondingly in gripping contact with the adjacent portions of the peripheral margins 12 of the plastic sheet 11 and in releasably locking engagement correspondingly with the counterpart adjacent gripping tongue receiving grooves 9 and seating tongue receiving grooves 10 which operatively receive them. Such cooperating tongues and grooves are accordingly arranged for maintaining the plastic sheet 11 in substantially taut or tight condition across the window space 6 and the cover strips 13 in substantially stationary yet removable disposition on the linear members 4.

Of course, the adjacent portions of the peripheral margins 12 of the plastic sheet 11 are interposed in gripping engagement respectively between such gripping and seating tongues and grooves, 14, 15 and 9, 10, as the case may be, so that the engagement between the tongues and grooves contemplates the intervening presence of the plastic sheet thereat.

Optionally, if desired, the peripheral margins 12 of the plastic sheet 11 may be sized to extend only to the cooperating gripping tongue receiving grooves 9 and gripping tongues 14, whereupon the contact between the cooperating seating tongue receiving grooves 10 and seating tongues 15 will be a direct friction fit contact while that between the cooperating gripping tongue receiving grooves 9 and gripping tongues 14 will be an indirect friction fit contact through the plastic sheet 11 sandwiched therebetween.

If desired, the gripping tongues may be provided with optional friction enhancing surface portions or roughened portions or surfaces 16 for enhanced friction gripping surface contact with the corresponding adjacent portions of the peripheral margins 12 of the plastic sheet 11 thereat (FIG. 4). Such friction surfaces 16 can be provided in the form of knurled areas, linearly scored areas, or the like, as the artisan will appreciate, whereby to enhance the gripping of the plastic sheet 11 between the corresponding tongues and grooves.

Perimetric compression thermal insulation sealing means 17, e.g. in the form of resilient compressible, fluid impervious rubber or plastic sponge material, extends continuously in the form of an outer facial layer (FIGS. 1 and 4) along the linear members 4 peripherally outwardly of the enclosure frame 5 and outwardly bounds the same for compression sealing facial contact peripherally outwardly against the counterpart receiving frame portion 2 of the existing correspondingly or complementally sized and shaped window opening structure in connection with which the device 1 is to be used.

Because of the dead weight it must bear, the underside sealing means portion 18 is advantageously composed of a structurally stronger and less resiliently compressible or denser sponge material than that of the remaining or lighter density sponge material lateral and upper side sealing means portion 19.

Perimetric sealing means 17 may be suitably permanently bonded by an adhesive or the like to the perimeter of the frame 5 along and in contact with the outside outer edge portion or wall surface of the linear members 4 thereat, as the artisan will appreciate.

Furthermore, handle means 20 may be suitably provided on the device 1 and arranged for access when the device is positioned in nested relation against such counterpart frame portion 2, to aid in removing the device therefrom (FIGS. 1 and 2).

Handle means 20 may comprise for instance a nylon strap folded on itself and extending from its freely disposed and readily graspable loop portion positioned outwardly of the front or exterior side of the device 1, rearwardly under the outer edge of the denser sponge material underside sealing means portion or strip 18 to its ends located, e.g. via a fastening means such as a rivet 21, on the rear or interior side of the device.

Figure 3:
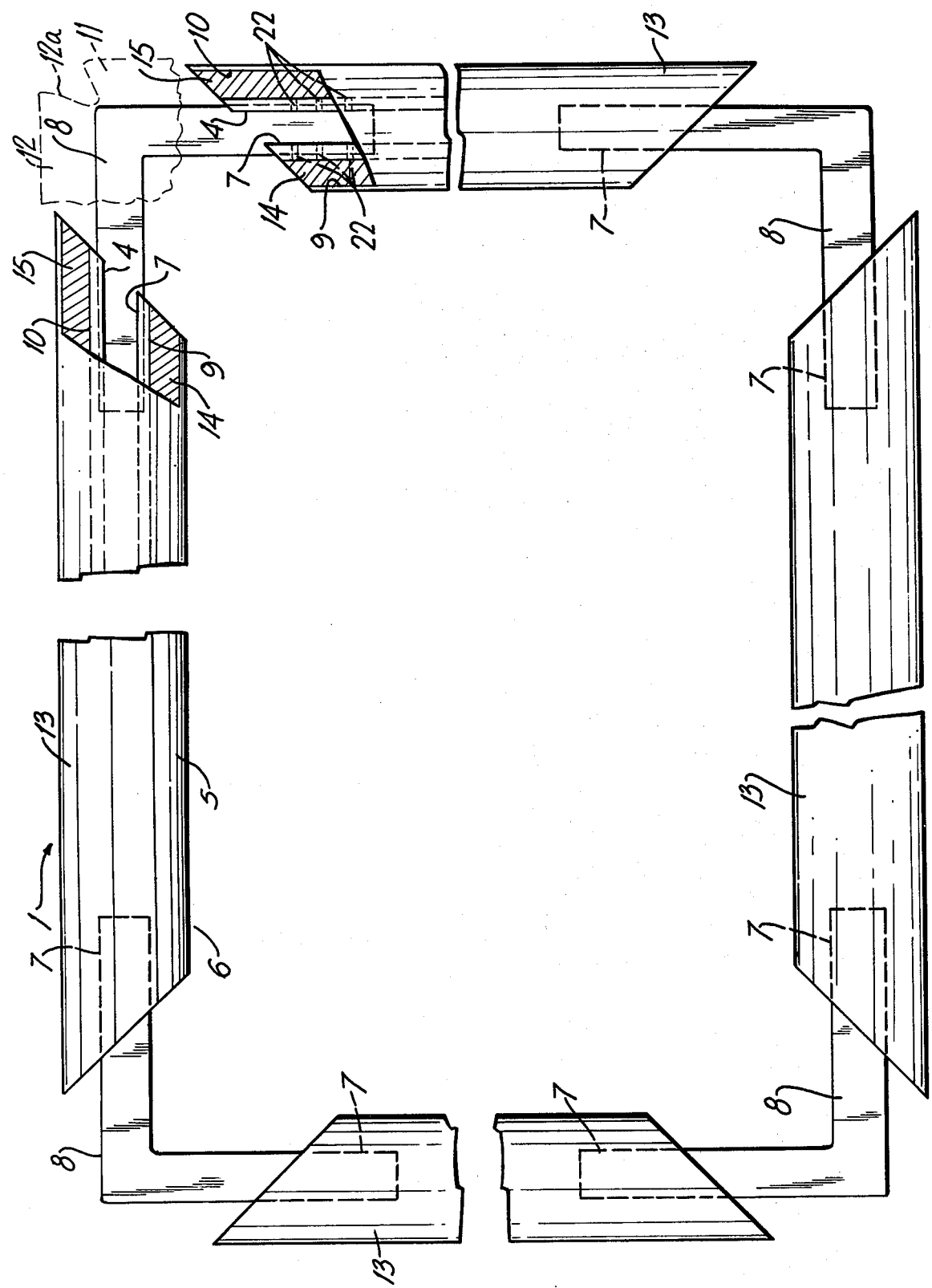
FIG. 3 is a schematic enlarged partially exploded view of portions of the device of FIG. 1 which shows the manner in which the device is assembled.
Figure 5:
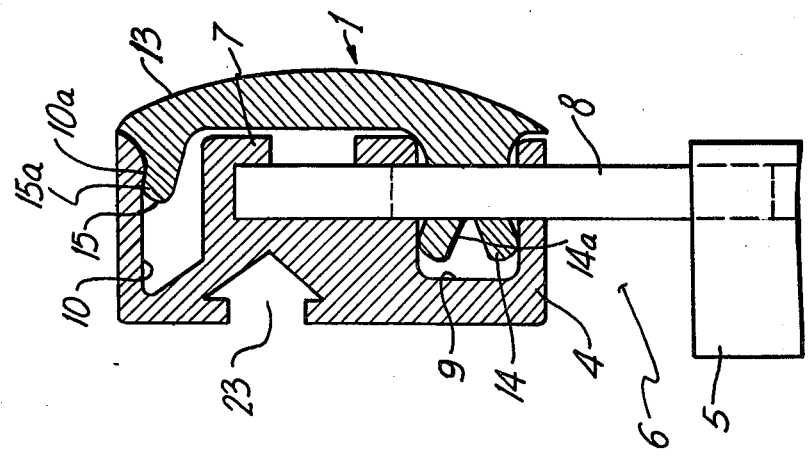
FIG. 5 is a schematic enlarged partial sectional view of a corner portion of the device as shown in FIG. 3, but in accordance with a modified detail of construction of a portion of one of the elements therein.

As shown in FIGS. 3 and 5, the frame 5 is assembled by inserting the four interconnectors 8 into the retaining insert means 7 at the correspondingly opposed ends of the successively end to end arranged linear members 4 whereby to form corner connections.

This may be suitably accomplished through the simple expedient of sliding the corresponding cooperating parts into telescoping relation with one another until the opposed ends of the linear members abut with one another at the miter joint thereat and the opposed arm portions of the interconnectors are completely insertingly received in the correspondingly opposed retaining insert means or troughs 7. Normally, this operation will be accomplished before the four cover strips 13 are mounted on the linear members 4.

Hence, by the use of a simple crimping tool, the end portions of the linear means defining the retaining insert means or troughs 7 may be conveniently crimped against the adjacent portion of the corresponding interconnector 8 slidingly received therein, to form crimped areas 22 stationarily and permanently fixedly joining these parts in stable disposition to prevent separation of the frame 5 (FIGS. 1, 3 and 4).

It will be seen that in fact the retaining insert means or troughs 7 are advantageously arranged to embrace substantially surroundingly captively (FIG. 4) the adjacent arm portions of the interconnectors 8 insertingly received therein, to permit the corresponding end portion of the vicinal structure of the linear means 4 constituting such retaining insert means or troughs 7 to be readily crimped against such interconnector arm portions for the desired purposes (FIGS. 4 and 5).

Moreover, by providing the cross section complemental profiles of the interconnectors 8 and retaining insert means or troughs 7 in other than a circular shape, e.g. right rectangular shape, these interconnected parts will avoid any possible tendency toward rotation of the various sides of the frame 5 and thereby prevent displacement of such frame out of its normal intended planar disposition (FIGS. 4 and 5).

As shown in FIG. 4, upon alignment of the plastic sheet 11 over the frame 5, e.g. on a horizontal support surface (not shown), the adjacent portion of the peripheral margin 12 of the plastic sheet is interposed between the particular linear member 4 and cover strip 13. Then the cover strip is forced by snap friction fit, either manually or by a simple forcing tool, downwardly into locking engagement with the linear member. This will force the peripheral margin 12 thereat between the tongues 14 and 15 and the counterpart grooves 9 and 10, respectively.

After one side of the plastic sheet 11 is anchored in place in this manner, the opposite side may be so anchored by repeating the operation, taking care to keep the plastic sheet in smooth, taut disposition and to avoid the presence of wrinkles in the plastic sheet. Thereafter, each of the remaining lateral sides of the plastic sheet may be in turn anchored in place by further repeating the operation successively, taking like care to keep the plastic sheet in smooth, taut disposition.

Any exposed edges of the plastic sheet 11 extending beyond the perimeter of the outer corresponding edges of the cover strip 13 at this point may be simply trimmed away by a suitable knife or other cutting tool. This will provide a neat appearance for the frame 5, and one which is free from wrinkles in the plastic sheet 11 disposed across the window space 6 thereof.

In that condition, the plastic sheet 11 will be advantageously taut or tight and substantially dimensionally stable within its own plane as well as substantially resistant to tension forces acting in the resultant direction of its own plane, as where nylon or similar plastic material possessing these qualities is used as the material for the plastic sheet 11.

As may be appreciated from FIG. 2, in this regard, any force acting transversely of the plane of the exposed area of the plastic sheet 11 in the window space 6, such as might be generated by pushing a finger against the plastic sheet thereat, will act to place the plastic sheet under tension stretching forces. These tension forces will be resolved in the resultant direction of the normal common plane of the plastic sheet and will be inherently resisted by the substantially dimensionally stable and tension resisting forces inherently possessed by the plastic sheet material itself, as aforesaid.

It will be seen from FIGS. 4 and 5 that the seating tongue 15 of each cover strip 13 is advantageously provided with a latch bead 15a and that the corresponding seating groove 10 of each linear member 4 is provided with a counterpart lock bead 10a, whereby to achieve a positive releasable locking engagement between these parts and a more complete seating of the adjacent portion of the peripheral margin 12 of the plastic sheet 11 thereat.

This complements the positive forced friction fit between the corresponding gripping tongue 14 of the cover strip 13 and the gripping groove 9 of the linear member 4 adjacent thereto, and which is enhanced where the gripping tongue 14 is provided with an increased friction surface 16 for contact with the adjacent portion of the peripheral margin 12 of the plastic sheet 11 thereat.

Provision may be made in the linear members 4 for an optional mounting recess 23, if desired, for use in mounting any additive fixture or element to the device 1, for instance a further or supplemental sealing strip (not shown) sized and shaped at its base portion for forced friction fit insertion along such mounting recess 23.

As an added modification detail, as shown in FIG. 5, the gripping tongue 14 of each cover strip 13 may be provided with an optional central V-shaped groove 14a in its distal or free end portion to contribute added resiliency to the gripping tongue when placed in locking engagement with the counterpart gripping groove 9 of the linear member 4 thereat. Similar resiliency will also inherently be provided in the locking engagement between the seating tongue 15 of each cover strip 13 and the counterpart seating groove 10 of the linear member 4 thereat by reason of the reduced or thinner width dimension of the seating tongue relative to its length (FIGS. 4 and 5).

Such resiliency will be effective due to the natural resilient reserve in the basic material used to form the cover strips 13 and linear members 4, as where aluminum or similar metal or metallic material possessing these qualities is used as the material for these frame parts.

Hence, should the need arise to replace the plastic sheet 11 for any reason, for instance in the event of accidental damage thereto by puncturing, tearing or the like, the cover strips 13 may be readily and easily removed, either manually with a simple prying tool or by a specially designed tool, as the artisan will appreciate.

Such can be accomplished without marring or damaging the frame parts by taking ordinary care to pry off each cover strip incrementally along the exposed seam or interface between such cover strip and the counterpart linear member thereat. After replacing the plastic sheet 11 by a like substitute sheet, the cover strip in each instance can be remounted in accordance with the procedure previously described.

Because of the inherent resilient quality of the material used to form the cover strips 13 and linear members 4 such removal and replacement of the cover strips can be carried out with a minimum of effort. It will be realized in this regard that the removal of the cover strips 13 in no way affects the basic stable disposition of the frame 5 since the interconnectors 8 are permanently fixed, e.g. by crimping at crimped areas 22 of the retaining insert means or troughs 7, to the corresponding linear members 4.

Preferably, the linear members 4, interconnectors 8 and cover strips 13 will be formed as simple extruded metal products in appropriate dies of simple and inexpensive design. Of course, the interconnectors will thereafter be subjected first to a cutting step and then to a bending step to achieve the desired size and, e.g. right, angular configuration, and the linear members and cover strips will similarly be subjected to a cutting step to achieve the desired size and miter joint corners for producing the frame.

While metal material as described above is preferred for producing the pertinent structural components of the frame, it will be appreciated that other materials, especially plastic materials such as nylon or the like may also be used therefor instead, so long as the basic objects and purposes of the present invention are likewise achieved thereby.

As will be appreciated from the foregoing, the device of the present invention constitutes a composite unitary assembly which may be inserted into and nested in a counterpart frame portion of an existing window opening structure in spaced relation to the normal window thereat (FIG. 2), so as to form an insulating air space therebetween, impervious to fluid flow through the device, and thus effectively providing thermal insulation against exchange of heat or cold therethrough, and regardless of whether the device is mounted as an exterior storm window or as a so-called interior storm window. Preferably, however, the device will be mounted as such interior storm window.

By reason of the inherent resiliency of the perimetric sealing means 17, the same will be able to accommodate advantageously any slight variations in dimensions and local unevenness as may exist in the counterpart frame portion of the existing window opening structure in which it is insertingly mounted, all without detriment to the thermal insulation effect desired. Thus, the device may be suitably made in standard window opening sizes and need not be tailored individually to the exact dimensions, contour and configuration of the counterpart frame portion of the existing window opening structure in question.

Moreover, by reason of such perimetric sealing means 17, the device may be simply pushed the desired distance into the counterpart frame portion cavity in resilient friction fit therewith, where it will remain in stable, static and self-disposed condition without the need for any attachment fixtures or extraneous connection means at all. To remove the device, the user need merely grasp the exposed handle means 20 and pull until the device travels outwardly that same distance from the counterpart frame portion cavity and/or sufficiently to be manually held and transported from the site.

As noted above, by providing the lowermost portion of the perimetric sealing means 17 as a dense sponge material 18, the full static or dead weight resultant load of the device 1 may be readily accommodated thereon indefinitely without the device parting at the top lighter density sponge material 19 from its normal sealing disposition against the adjacent top portion of the counterpart frame portion thereat. Naturally, the width or thickness dimension of the perimetric sealing means 17 will be selected relative to the complemental size of the counterpart frame portion with respect to which it is intended to be used, so as to provide a slightly larger perimeter than that of the counterpart frame portion to insure a snug and resiliently tight fit throughout the entire extent of their common contact and disposition as well as a corresponding tight and fluid impervious seal therebetween.

In case of an emergency, the device 1 when used as a so-called inside storm window may be rapidly removed by pulling the handle 20, and when used as an outside storm window may be equally rapidly removed, after opening the normal window, by simply pushing outwardly against device 1.

As may be seen schematically from FIG. 3, the plastic sheet 11 at the corner portions of the peripheral margins 12 thereof may be optionally cut away to form corner notches 12a for more even disposition in the corner portions of the frame where some gathering of the plastic sheet 11 will normally occur. Alternatively, the opposed notched edges of such notches 12a may be fused or cemented together, e.g. by use of heat or a known adhesive, as the case may be, to provide for a more efficient seating of the plastic sheet 11 in the corner portions of the frame 5.

The slight convex or beveled shape resulting from such fusing or cementing at the corner portions of the peripheral margins 12 thereat in accordance with this alternative modification will enhance the seating disposition of the plastic sheet 11 in place on the frame 5, as the artisan will appreciate.

This is especially advantageous where such fused or cemented convex or beveled corner modified plastic sheet is intended to be provided in selective standard sizes as a replacement sheet, since such form will lend itself to facile positioning in the frame 5 in taut condition so as to enable the cover strips 13 to be remounted in place on the corresponding linear members 4 as described above, i.e. for releasable locking and seating engagement between the continuous tongue means on the cover strips and continuous groove means on the linear members.

Of course, the device 1 will be preferably provided in selective standard sizes and shapes for use in counterpart sized and shaped window opening structures.

Thus, the device according to the present invention, advantageously due to its improved construction, utilizes a minimum number or widely available and inexpensive types of elements which may be readily and easily assembled with reduced effort, labor, material and production costs including tooling; which is durable and robust in use yet relatively light in weight and easy to hold and manipulate; and which permits simple and rapid installation and removal and is therefore safe in terms of providing an available escape route through the window in the event of an emergency.

Furthermore, the instant device, also advantageously due to its improved construction, is highly efficient in providing insulation from exchange of heat and/or cold through the window area at which it is installed; may be mounted as an inside or outside storm window and in a manner permitting easy removal for cleaning or storage; is essentially fire-proof and thus serves as an added protection when installed as a so-called inside storm window; and is adapted to be used on both old and new window opening structures with equally favorable accommodation and thermal insulation results.

It will be appreciated that the foregoing specification and drawings are set forth by way of illustration and not limitation of the present invention, and that various changes and modifications may be made therein without departing from the spirit and scope of the present invention which is to be limited solely by the scope of the appended claims.

What is claimed is:

1. Window thermal insulation device for thermal insulation of a window opening area comprising:
   a plurality of linear members arranged in successive longitudinal end to end conforming abutment relation for forming thereby a perimetric selectively sized and shaped enclosure frame defining a window space therewithin and having an outer perimetric edge portion,
   a corresponding plurality of interconnectors arranged for interconnecting correspondingly the adjacent ends of the linear members and for maintaining the linear members in successive end to end interconnected stable disposition,
   linear locking groove means defined in the linear members and extending therealong peripherally outwardly of the window space and inwardly of the outer edge portion,
   a pliable plastic thermal insulation sheet extending across the window space of the frame and having its peripheral margins disposed correspondingly in the locking groove means of the linear members,
   a corresponding plurality of linear cover strips located externally on the frame and situated within the confines thereof between the window space and the outer edge portion and having linear locking tongue means projecting therefrom and disposed correspondingly in compression gripping contact with the adjacent portions of the peripheral margins of the plastic sheet and in compression locking engagement with the adjacent locking groove means and arranged for thereby maintaining the plastic sheet in substantially taut condition across the window space and the peripheral margins of the plastic sheet correspondingly in compressively lockingly engaged condition, and
   perimetric compression thermal insulation sealing means of resilient compressible fluid impervious sponge material in the form of an outer facial layer continuously extending along the outer edge portion of the linear members peripherally outwardly of the enclosure frame for compression sealing facial contact peripherally outwardly against a counterpart receiving frame portion of an existing correspondingly sized and shaped window opening structure to be thermally insulated thereby.

2. Device according to claim 1 wherein retaining means are internally provided within the corresponding longitudinal end portions of the linear members and the interconnectors are internal interconnectors successively insertingly received in the correspondingly opposed retaining means at the adjacent longitudinal end portions of the linear members and arranged in completely hidden condition internally within the linear members for interconnecting the adjacent ends of the linear members and for maintaining the linear members in successive end to end interconnected stable disposition.

3. Device according to claim 2 wherein the retaining means are arranged to embrace substantially surroundingly captively the adjacent portions of the interconnectors insertingly received therein and are crimped thereagainst for maintaining the interconnectors in substantially stationary disposition therein.

4. Device according to claim 1 wherein the locking tongue means of the cover strips include corresponding gripping tongues and seating tongues and the locking groove means of the linear members include corresponding counterpart gripping tongue receiving grooves and seating tongue receiving grooves for operatively compressingly receiving the gripping tongues and seating tongues for thereby maintaining the cover strips in substantially stationary disposition on the linear members with the adjacent portions of the peripheral margins of the plastic sheet interposed in compression gripping engagement between the gripping tongues and gripping tongue receiving grooves and with the seating tongues in compression seating engagement with the seating tonque receiving grooves.

5. Device according to claim 4 wherein the seating tongues are located peripherally outwardly of the gripping tongues and the seating tongue receiving grooves are located peripherally outwardly of the gripping tongue receiving grooves and the adjacent portions of the peripheral margins of the plastic sheet extend peripherally outwardly to the seating tongue receiving grooves and are also interposed in compression gripping engagement between the seating tongues and seating tongue receiving grooves.

6. Device according to claim 4 wherein the gripping tongues are provided with friction enhancing roughened surface portions arranged for enhanced compression friction gripping surface contact with the corresponding adjacent portions of the peripheral margins of the plastic sheet thereat.

7. Device according to claim 1 wherein the plastic sheet is a light admitting and fluid impervious sheet.

8. Device according to claim 7 wherein the plastic sheet is substantially dimensionally stable within its own plane and substantially resistant to tension forces acting in the resultant direction of its own plane.

9. Window thermal insulation device for thermal insulation of a window opening area comprising
   a plurality of linear structural members arranged in successive longitudinal end to end conforming abutment relation for forming thereby a perimetric selectively sized and polygonally shaped planar enclosure frame defining a window space therewithin and having an outer perimetric edge portion,
   retaining means internally disposed within the corresponding longitudinal end portions of the linear members,
   a corresponding plurality of stabilizing angular internal interconnectors successors insertingly received in the correspondingly opposed retaining means at the adjacent end portions of the linear members and arranged in completely hidden condition internally within the linear members for interconnecting correspondingly the adjacent ends of the linear members and for maintaining the linear members in successive end to end interconnected stable disposition,
   corresponding linear gripping tongue receiving grooves and linear seating tongue receiving grooves defined in the linear members and extending therealong peripherally outwardly of the window space and inwardly of the outer edge portion, the seating tongue receiving grooves being located peripherally outwardly of the gripping tongue receiving grooves,
   a light admitting and fluid impervious pliable plastic thermal insulation sheet extending across the window space of the frame and having its peripheral margins disposed correspondingly in the gripping tongue receiving grooves and in the seating tongue receiving grooves of the linear members,
   a corresponding plurality of linear cover strips located externally on the frame and situated within the confines thereof between the window space and the outer edge portion and having corresponding linear gripping tongues and linear seating tongues projecting from the cover strip and disposed correspondingly in compression gripping contact with the adjacent portions of the peripheral margins of the plastic sheet and in releasable compression locking engagement correspondingly with the adjacent gripping tongue receiving grooves and seating tongue receiving grooves and arranged for thereby maintaining the plastic sheet in substantially taut condition across the window space and the cover strips in substantially stationary disposition on the linear members with the adjacent portions of the peripheral margins of the plastic sheet interposed in compression gripping engagement respectively between such gripping and seating tongues and grooves,
   perimetric compression thermal insulation sealing means of resilient compressible fluid impervious sponge material having closed sponge spaces preventing fluid flow therethrough and in the form of an outer facial layer continuously extending along the outer edge portion of the linear members peripherally outwardly of the enclosure frame for compression sealing facial contact peripherally outwardly against a counterpart receiving frame portion of an existing correspondingly sized and polygonally shaped window opening structure to be thermally insulated thereby, and
   handle means arranged for access when the device is positioned against such counterpart frame portion to aid in removing the device therefrom.

* * * * *